United States Patent
Dudley

[15] 3,650,557

[45] Mar. 21, 1972

[54] MOTOR VEHICLES

[72] Inventor: John T. Dudley, Brewood, England

[73] Assignee: GKN Sankey Limited, Bilston, Stafford, England

[22] Filed: Mar. 9, 1970

[21] Appl. No.: 17,853

[30] Foreign Application Priority Data

Mar. 11, 1969 Great Britain......................12,775/69

[52] U.S. Cl. ..............................296/28 C, 16/191, 180/89, 292/DIG. 65, 296/146

[51] Int. Cl......................................................B62d 33/06

[58] Field of Search....................296/28 C, 146, 76; 180/89; 292/DIG. 65; 16/191

[56] References Cited

UNITED STATES PATENTS

| 2,781,102 | 2/1957 | Prichard..............................296/28 C |
| 3,525,687 | 8/1970 | Ross et al.................................296/76 |
| 3,336,075 | 8/1967 | Wilson..................................296/146 |

FOREIGN PATENTS OR APPLICATIONS 1,061,387  3/1967  Great Britain........................296/146

Primary Examiner—Benjamin Hersh
Assistant Examiner—John A. Pekar
Attorney—Kurt Kelman

[57] ABSTRACT

To prevent the doors of a tilting cab type vehicle swinging open inadvertently when the cab is in its tilted position, each door is provided with arrester means which are operative when the cab is tilted but disabled when the cab is in its normal position. The arrester means comprise a ratchet and pawl device, the pawl device being spring urged into engagement with the ratchet through the intermediary of a pivoted arm, the ratchet and pawl device and the arm being mounted on the cab adjacent to the respective door. An adjustable stop is mounted on the chassis of the vehicle and arranged to engage the arm when the cab is in its normal position so as to disengage the pawl from the ratchet. The ratchet may be afforded by a part secured to the door hinge, a part of the door hinge itself, or a check strap.

6 Claims, 5 Drawing Figures

Patented March 21, 1972

INVENTOR
JOHN T. DUDLEY

INVENTOR
JOHN T. DUDLEY
BY [signature]
AGENT

INVENTOR
JOHN T. DUDLEY
BY [signature]
AGENT 3,650,557

MOTOR VEHICLES

BACKGROUND OF THE INVENTION

1. Field of the Invention

This invention relates to motor vehicles having tilting cabs. Such cabs are used mainly in commercial motor vehicles having the engine mounted within, or under, or partly within and partly under, the cab, the cab being tiltable relative to the vehicle chassis to provide access to the engine and associated components.

2. Description of the Prior Art

A problem which arises with such vehicles is that if the cab is tilted with a door thereof partly open and not properly latched the door will swing open as the cab is tilted. In swinging open, the door may be damaged or damage may be caused to the hinge mechanism or post on which it is hinged, and in addition any article in the path of the door as it swings open could be damaged. In particular, such swinging of the door to its open position consequent on tilting of the cab may injure attendant personel.

SUMMARY OF THE INVENTION

It is an object of the present invention to provide an arrangement for preventing an unlatched door of a tilting cab from swinging open as the cab is tilted.

The present invention resides in a motor vehicle including a chassis, a cab arranged to tilt relative to the chassis between normal and tilted positions, at least one door hinged to the cab, arresting means operable to hold the or each door when in an open position to prevent further substantial opening movement thereof and first and second complementary actuating means, associated with the arresting means and respectively mounted on the cab and the chassis in a manner such that when the cab is in its normal position the arresting means is disabled by one of said actuating means but so that the arresting means is rendered operative by the other of said actuating means when the cab is in its tilted position or in a position intermediate its normal and tilted positions.

By using this arrangement, the arresting means is disabled when the cab is in its normal position so that normal opening and closing of the, or each, door is permitted. When the cab is tilted, however, the arresting means is rendered operative to prevent any, or any further, substantial opening movement of the door so that damage to the door, its hinge, its mounting post, or any article or person which would be in the way of the door if it was allowed to swing open, is prevented.

Preferably, the arresting means comprises a ratchet and pawl mechanism arranged so that said door, if open, can be moved towards its closed position even when the arresting means is operative to prevent further substantial opening movement of the door. It is obviously convenient to be able to close an open door without hindrance when the cab is tilted.

The ratchet teeth are preferably formed on a part which is movable with the door and the pawl is pivotally mounted on the cab. The ratchet may be formed on a quadrant secured to a hinge part of the door. In another arrangement, the ratchet may be formed on a part of the hinge means for the door. In a still further arrangement, where a check strap is provided to limit the extent to which the door may open, the ratchet teeth may be formed on the strap.

The first complementary actuating means may be an arm pivotally mounted on the cab and spring urged into a position in which the arresting means is rendered operative, the second complementary actuating means comprising a stop on the chassis arranged to engage said arm when the cab is in its normal position and thereby displace said arm against the effect of said spring into a position in which the arresting means is disabled.

The pivot point of the cab in such an arrangement may be such that during tilting of the cab the arm moves away from the stop in an arc and is disengaged therefrom so that the arm moves under the effect of said spring into said position in which the arresting means is rendered operative.

BRIEF DESCRIPTION OF THE DRAWINGS

The invention will now be described in detail with reference to the accompanying drawings in which.

DESCRIPTION OF THE PREFERRED EMBODIMENTS

Figure 1:
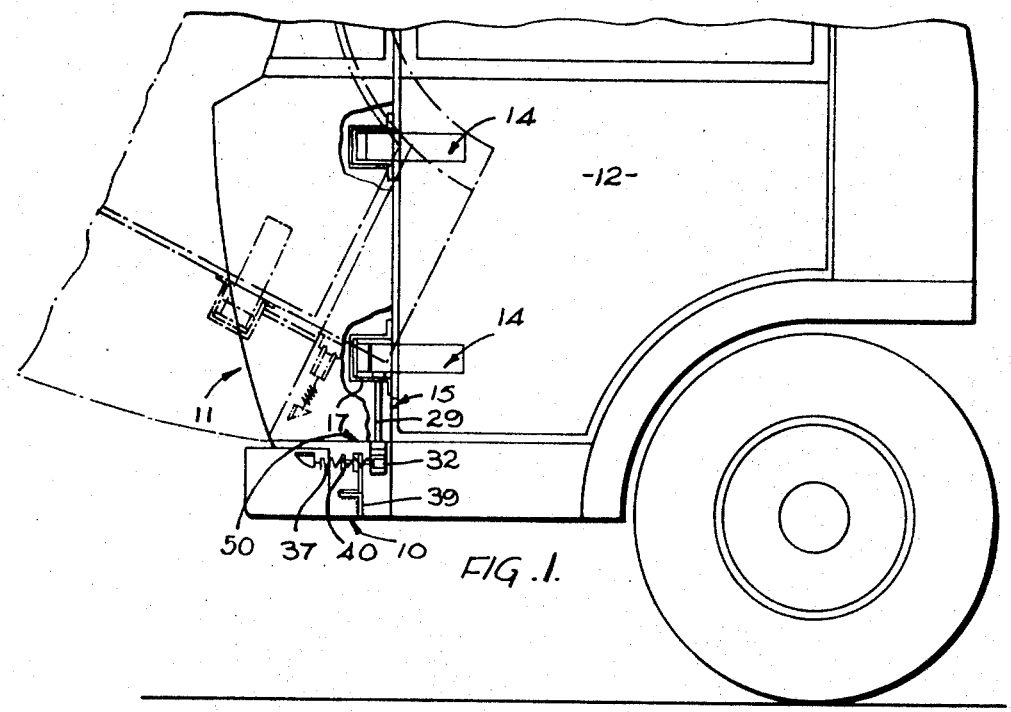
FIG. 1 shows a partial side elevation of a vehicle in accordance with the invention.
Figure 5:
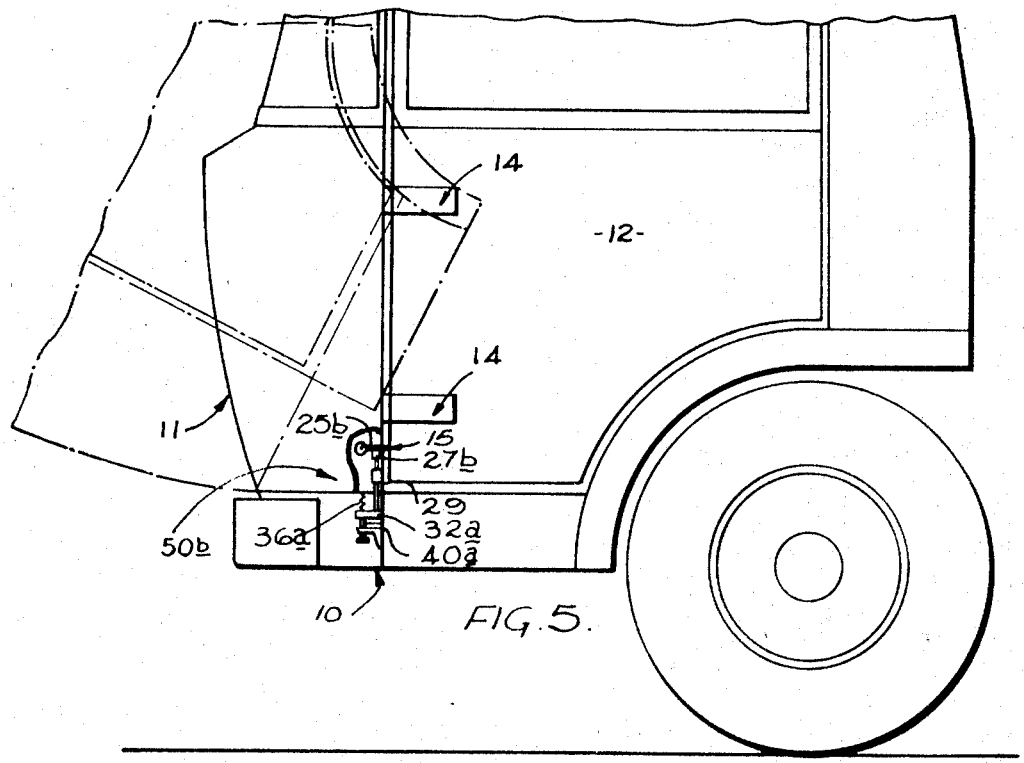
FIG. 5 shows a partial side elevation equivalent to FIG. 1 showing a motor vehicle equipped with the embodiment of arresting means and actuating means shown in FIG. 4.

In FIGS. 1 and 5 there is shown a vehicle including a chassis 10 on which is mounted a cab 11. The cab 11 is pivotally secured to the chassis 10 in known manner and is tiltable relative to the chassis from a normal position, as shown in full lines, to a tilted position as shown in broken lines. The cab 11 has a door 12 on each side thereof through which access to the interior of the cab may be obtained.

Figure 2:
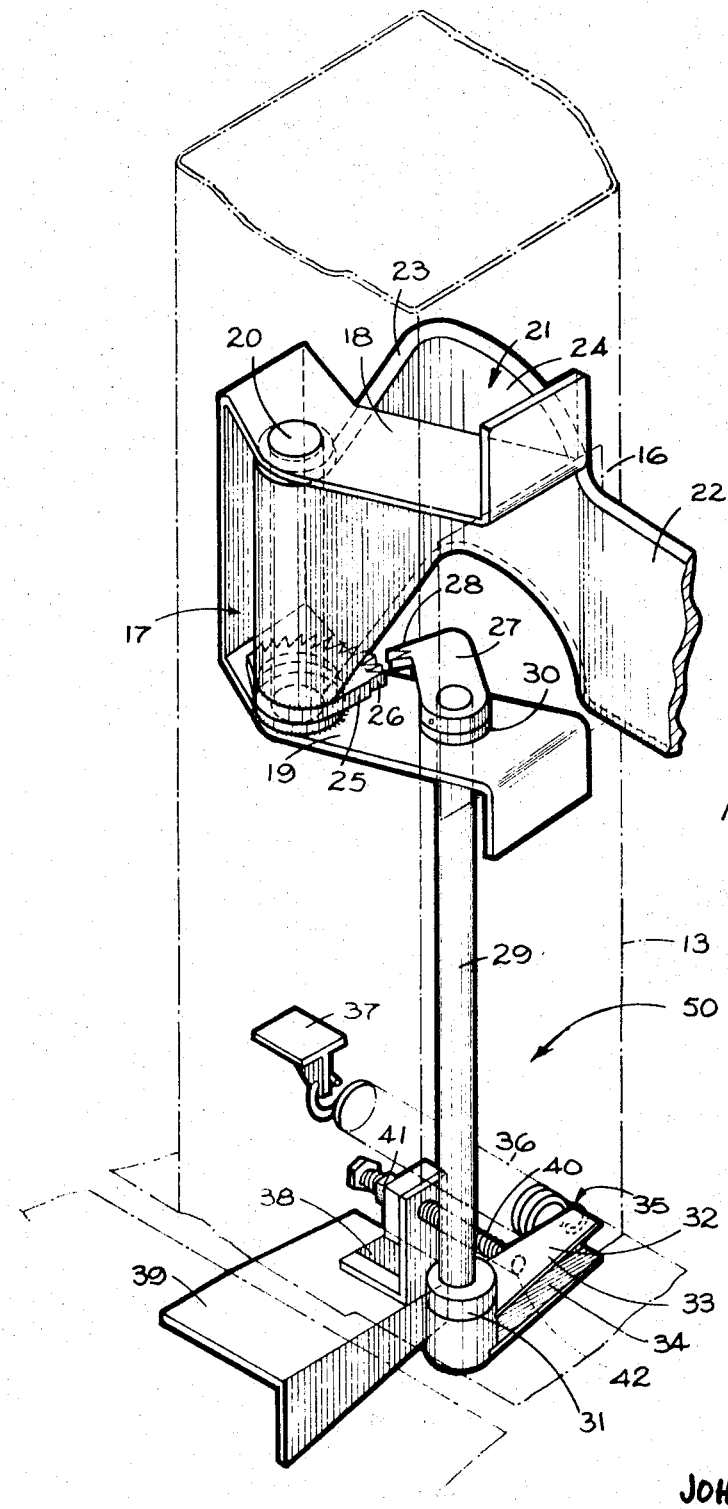
FIG. 2 shows a perspective view of the arresting means and actuating means included in the embodiment shown in FIG. 1.

The cab includes a mounting post 13 which is not visible in FIGS. 1 and 2 but is indicated in the remaining Figures. The door 12 is hinged to the mounting post by hinge means indicated generally at 14, and a check strap is provided as indicated at 15.

In each case, means as indicated respectively at 50 and 50b are provided to prevent opening movement of the door 12 when the cab is in its tilted position.

The arresting means 50 of the embodiment shown in FIG. 1 are illustrated in detail in FIG. 2. In FIG. 2, the mounting post 13 is illustrated in the position which it occupies when the cab 11 of which it forms part is in its normal position.

The mounting post 13 is formed with a rectangular aperture 16 in which is supported a generally U-shaped bracket 17 having upper and lower parallel flanges 18 and 19. A pivot pin 20 extends vertically between the flanges and a hinge bracket 21 is pivotally mounted thereon. The hinge bracket 21 is generally of hooked shape and includes an outer portion 22 whereby it is secured to the door 12 and an inner portion 23 which extends generally transversely of the outer portion 22 and terminates in a cylindrical part through which the pivot pin 20 passes. The inner and outer parts of the hinge brackets 21 are integrally united by a curved part 24 which is conveniently of part cylindrical form with its curvature centered on the axis of the pivot pin 20.

Secured to the lower edge of the inner portion 23 is a quadrant plate 25 which is arranged with its center coincident with the axis of the pivot pin 20. It will thus be apparent that the quadrant plate 25 pivots with the door 12 relative to the bracket 17 when the door is opened and closed.

The quadrant plate 25 is formed with a row of ratchet teeth 26 extending along its circumferential edge.

A pawl 27 is pivotally secured to the lower flange 19 of the bracket 17 and is formed with teeth 28 adapted to engage with the ratchet teeth 26 of the quadrant plate 25.

The pawl 27 is secured to the upper end of a vertical rod 29 which is pivotally mounted in a collar 30 carried by the lower flange 19 of the bracket 17. The rod 29 is similarly pivotally mounted adjacent to its lower end in a further collar 31 secured to a fixed part (not shown) of the cab 11.

At its lower end, the rod 29 has secured thereto a radially extending arm 32. The arm 32 is itself of generally U-shape in section and includes upper and lower flanges 33 and 34 which are united by a vertical web through radiused corners such as 35.

A tension spring 36 is secured at one end to the free end of the arm 32 and at the other end to a fixed mounting bracket 37 secured to the cab 11. The arm 32 is thus urged in an anticlockwise direction as seen in FIG. 2, thus tending to bring the pawl 27 into engagement with the quadrant plate 25.

A bracket 38 is fixedly mounted on a part 39 of the chassis 10 and carries a stop pin 40. The pin 40 is formed as a threaded bolt which is received in a threaded bore formed in the bracket 38 and carries a lock nut 41.

The stop pin 40 is thus adjustable longitudinally. The free end 42 of the stop pin is of generally rounded or domed form and is arranged to engage the vertical web of the arm 32 at a position offset from the rod 29.

The stop pin 40 is so adjusted that, when the cab is in its normal position as shown in FIG. 2, the domed end 42 of the stop pin 40 engages the arm 32 and holds the pawl 27 clear of the quadrant plate 25. Thus, normal opening and closing of the door 12 is unaffected while the cab 11 is in its normal position.

If the cab is now tilted, the arm 32 moves through a curved path in a substantially vertical plane and comes out of contact with the stop pin 40.

The precise direction of movement of the arm 32 will depend upon the position of the axis about which the cab 11 tilts relative to the stop pin 40, but the arrangement can readily be made such that the arm 32 initially moves in a generally vertically upward direction away from the stop pin 40.

As soon as the arm 32 is clear of the stop pin 40, the spring 36 causes the rod 29 to pivot about its axis so that the pawl 27 engages the quadrant plate 25. The teeth 28 of the pawl 27 thus engages the teeth 26 of the quadrant plate 25 and thus coming in to effect to control the movement of the door 12.

As can be seen, the ratchet teeth 26 are each formed with a substantially radially extending face and an inclined face, and the pawl teeth 28 are of complementary shape. The arrangement is such that any tendency of the door 12 to move towards its open position is resisted by abutment of the radially extending faces of the ratchet teeth 26 and the pawl teeth 28. Thus, if a door is partly open when the cab is tilted from its normal position, the pawl 27 will engage the quadrant plate 25 and prevent substantial further opening movement of the door. The extent of further opening movement permitted to the door is limited by the pitch of the teeth 26.

However, if the door is already open, or partially open, when the cab is tilted, the pawl and ratchet mechanism 25 to 28 does not prevent movement of the door towards its closed position. This is due to the fact that the inclined faces of the teeth 26 and 28 can ride over one another.

Moreover, should it be required to open the door for some reason when the cab is tilted, the lever 32 can be operated manually to retract the pawl 27 from the quadrant plate 25. As the cab is moved back to its normal position, the arm 32 will engage the free end of the stop pin 40 and due to the domed shape of the end of the stop pin and the radiused corners 35 afforded by the arm, the arm will be deflected in a clockwise direction as shown in FIG. 2 against the action of the spring 36. The pawl 27 will thus be disengaged from the quadrant plate 25 so that when the cab is back in its normal position the door 12 can be opened and closed without hindrance.

The pawl and ratchet mechanism is shown in FIG. 2 as being applied to the lower hinge of the door and the upper hinge thereof may have any desired form and may incorporate a check strap to limit the maximum extent to which the door can be opened. Alternatively, the rod 29 may extend up to the upper hinge so that a similar pawl and ratchet mechanism can be provided at each hinge thus affording a further safeguard. In this case, a check strap separate from either hinge may be provided.

The quadrant plate 25 as shown in FIG. 2 is of such a size and is so positioned that the pawl 27 can engage therewith over substantially the whole range of opening movement permitted to the door. However, the pawl and ratchet mechanism need not be operative over the whole range of door opening movement since the risk of damage is considerably less when the door is initially in a nearly fully opened position. Thus, the pawl and ratchet mechanism need not be operative when the door is almost fully open.

Figure 3:
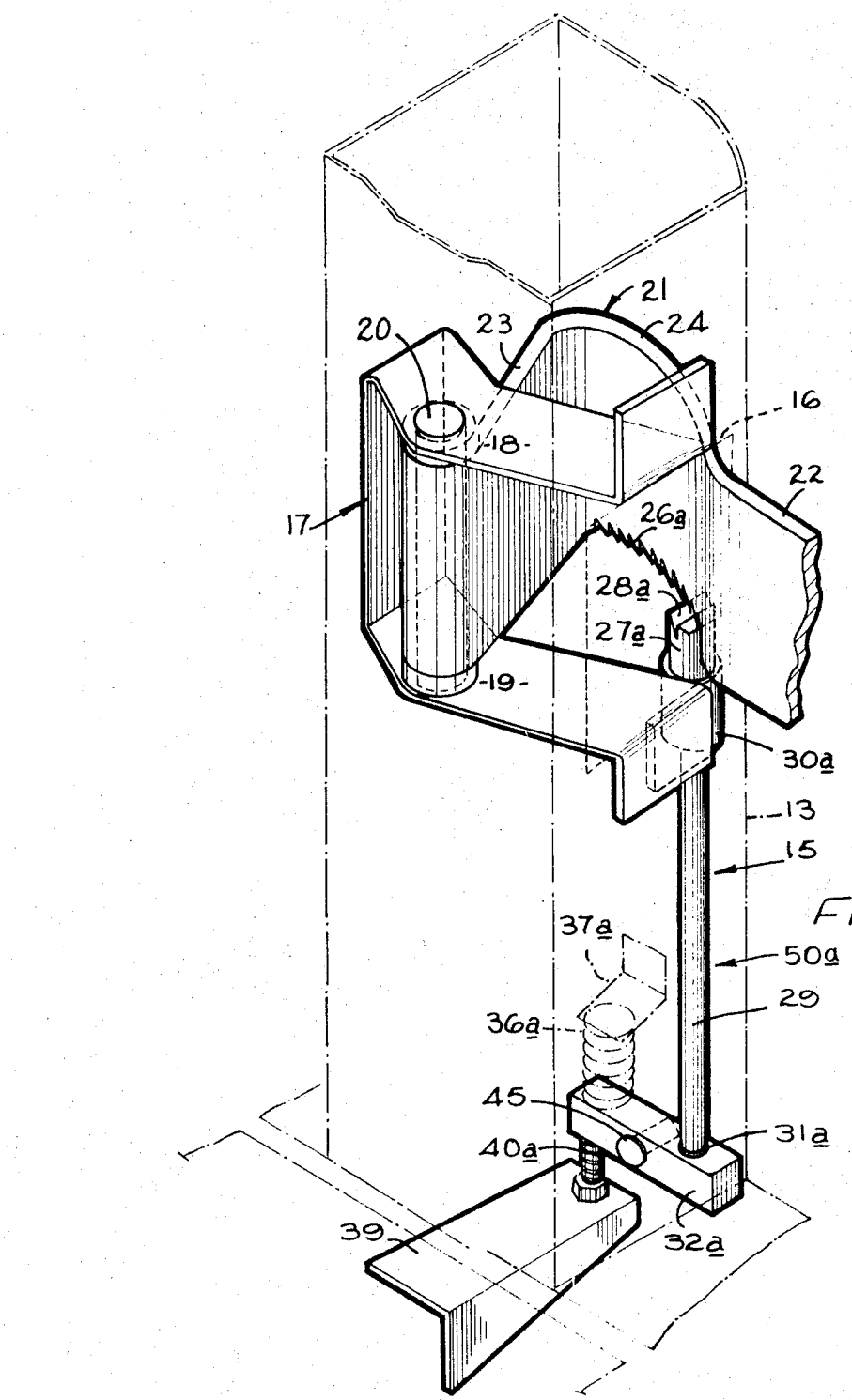
FIG. 3 shows a perspective view of an alternative embodiment of arresting means and actuating means.
Figure 4:
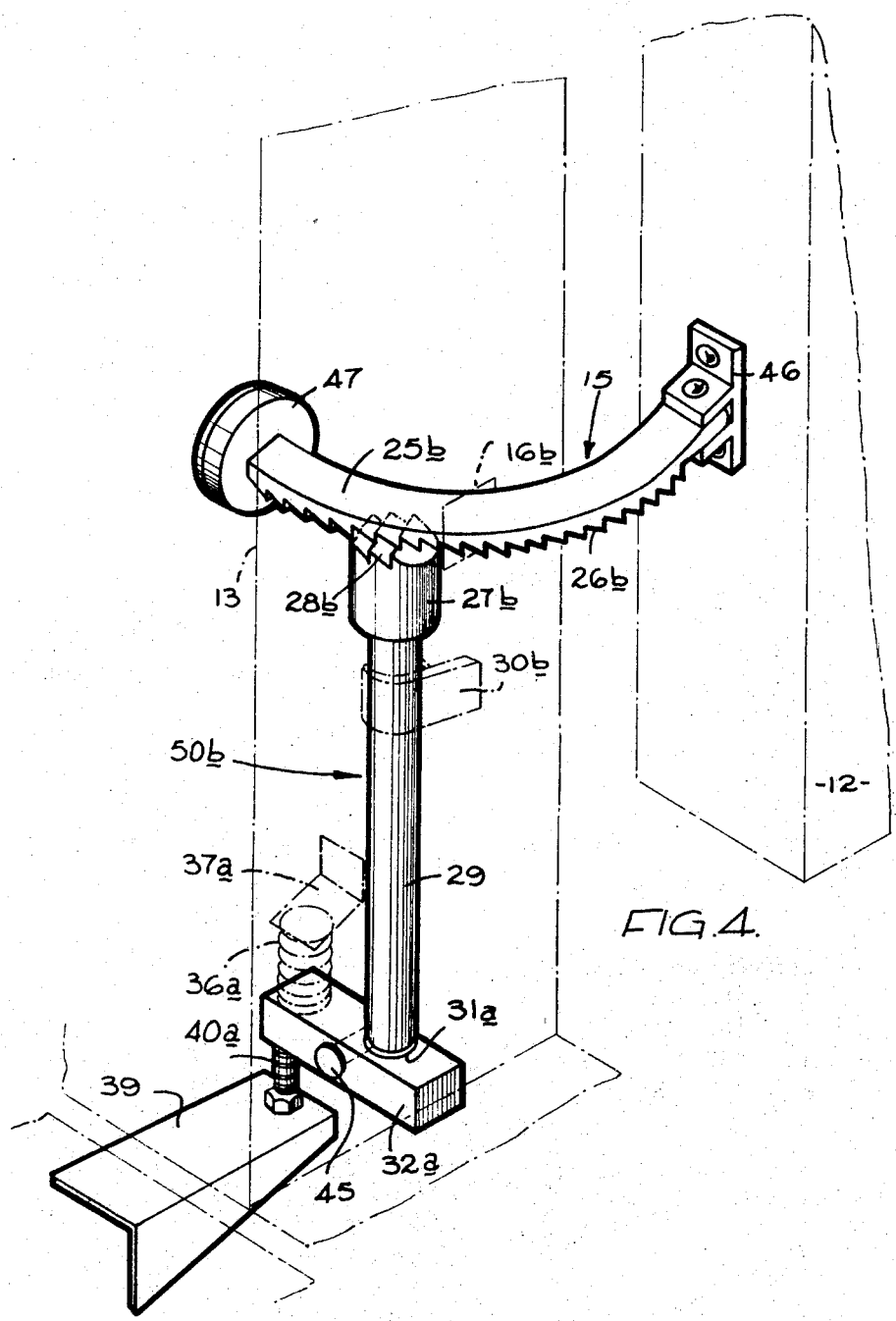
FIG. 4 shows a perspective view of a still further alternative form of arresting means and actuating means.

Various modifications may be made to the arrangement shown in FIG. 2, and two such modifications are illustrated in FIGS. 3 and 4. In these figures those parts common to the embodiment illustrated in FIG. 2 are indicated by the same reference numerals and the preceding description is to be deemed to apply.

Thus, the arresting means 50a shown in FIG. 3 includes a pawl and ratchet mechanism of which the ratchet is formed as part of the hinge bracket 21 itself. It can be seen, the ratchet teeth 26a are formed in the lower edge of the curved portion 24 of the hinge bracket 21. In this case the pawl 27a is formed as a rod like member having upwardly presented teeth 28a of complementary form to the ratchet teeth 26a. The pawl 27a is slidably received within a guide member 30a which is secured to the lower flange 19 of the bracket 17. The pawl 27a is carried at the other end of the rod 29 and the latter is free to move vertically.

The lower end of the rod 29 rests in a recess 31a formed in a transversely extending lever 32a which is pivotally secured internally of the mounting post 13 on a pivot pin 45. A compression spring 36a acts between a lug 37a within the mounting post 13 and the end of the lever remote from that at which it is engaged by the rod 29. The spring 36a urges the lever 32a into contact with a vertically arranged adjustable stop pin 40a.

The stop pin 40a is so set that when the cab is in its normal position the pin 40a holds the lever 32a in such a position that the pawl 27a is disengaged from the ratchet teeth 26a afforded by the hinge bracket 21. However, it will be evident that when the cab is tilted, the arm 32a as a whole will move generally vertically away from the stop pin 40a so that the arm 32a can pivot about the pin 45 under the action of the compression spring 36a. Such pivoting of the arm 32a lifts the pawl 27a into engagement with the ratchet teeth 26a so that the door 12 is prevented from moving towards an open position due to the inter-engagement of the teeth 26a and 28a. It can be seen that these teeth are shaped in a similar manner to the teeth 26 and 28 of the embodiments shown in FIG. 2 so that movement of the door towards its closed position is permitted even when the cab is tilted.

In a still further modification as illustrated in FIG. 4, the ratchet teeth are afforded by a check strap which is provided to limit the extent to which the door can be opened.

In FIG. 4, those parts common to the embodiments shown in FIG. 2 or 3 are likewise indicated by the same reference numerals so that the preceding description is to be deemed to apply. In this case, the door 12 is provided with a check strap 25b which is pivotally secured thereto by means of a lug 46. The strap 25b is of curved form and extends through an aperture 16b in the mounting post 13 of the cab 11. At its end remote from the lug 46, the strap 25b carries a stop member 47 which is intended to limit the extent to which the door 12 can be opened by abutment with either the inner face of the mounting post 13 or a bracket disposed within the latter. In accordance with the invention, the underside of the check strap 25 is formed to afford a row of ratchet like teeth 26b which include a vertically disposed face presented towards the adjacent edge of the door 12 and inclined face which slopes upwardly away from the door 12. The check strap 25b thus forms part of a pawl and ratchet mechanism of which the pawl 27b is afforded by a rodlike member formed with a plurality of complementary teeth 28b at its upper end. The pawl 27b is secured to the upper end of the rod 29 which is vertically slidable in a guide bracket 30b secured internally of the mounting post 13.

It can be seen that the pawl 27b is movable into and out of engagement with the ratchet teeth 26b in exactly the same manner as the pawl 27a is movable in relation to the ratchet teeth 26a in the embodiment shown in FIG. 3.

The embodiment of arrester means 50b shown in FIG. 4 is also illustrated in FIG. 5.

It will be observed that in all the illustrated embodiments, the pawl and ratchet mechanism is arranged internally of the mounting post 13 with the actuating means disposed beneath, or at, the lower end thereof. Where it is required to make the arm 32, or 32a accessible for manual operation, it may be necessary to provide an access opening adjacent to the lower end of the mounting post 13.

Instead of placing the spring 36a to engage the upper side of the arm 32a on the side of the pivot pin 45 remote from the rod 29, it would alternatively be possible to arrange the spring to engage the arm directly beneath the rod 29. Alternatively, it would be possible to arrange an equivalent spring to act directly on the underside of the pawl 27b, for example to act between the pawl 27b and the guide bracket 30b. In this case, the rod 29 would have to be positively secured to the arm 32.

It will thus be seen that the invention provides a simple means for preventing the doors swinging open on a tilting cab of a vehicle as the cab tilts if the doors are not securely latched in their closed positions.

I claim:

1. A motor vehicle including: a chassis, a cab arranged to tilt relative to the chassis between normal and tilted positions; at least one door hinged to the cab; arresting means operable to hold the, or each, door when in an open position to prevent further substantial opening movement thereof; and first and second complementary actuating means associated with the arresting means and respectively mounted on the cab and the chassis said first actuating means including an arm pivotally mounted on the cab and a spring engaging said arm and urging the same into a first position in which the arresting means is rendered operative, the second actuating means comprising a stop means on the chassis arranged to engage said arm when the cab is in its normal position for displacing said arm against the effect of said spring to a second position in which the arresting means is disabled whereby during tilting movement of the cab from its normal to its tilted position the arm moves away from said stop means in an arc and is disengaged therefrom so that said arm moves under the effect of said spring into said first position in which said arresting means is rendered operative.

2. A motor vehicle comprising: a chassis; a cab; first hinge means mounting the cab on the chassis for pivotal movement between normal and tilted positions; a door for the cab; second hinge means mounting the door on the cab for pivotal movement between open and closed positions; arresting means for the door and comprising first and second complementary inter-engaging parts on the cab and the door respectively; and actuating means comprising first and second complementary inter-engagable abutments on said first part and the chassis respectively and spring means urging said parts into engagement to prevent movement of the door towards its open position; said abutments inter-engaging when the cab is in its normal position to hold said parts out of engagement against the action of said spring means, pivotal movement of the cab towards its tilted position disengaging the abutments whereupon said parts are inter engaged by said spring means.

3. A motor vehicle as claimed in claim 2 wherein said parts comprise a toothed ratched member and a pawl, the teeth of the ratchet member being shaped to allow the door to be moved towards its closed position when said parts are engaged.

4. A motor vehicle as claimed in claim 3 wherein the second hinge means includes a pivot pin mounted on the cab and a hinge bracket secured to the door and pivotable about said pivot pin, the ratchet member being formed as a toothed quadrant plate secured to said hinge bracket to rotate therewith about the axis of said pin.

5. A motor vehicle as claimed in claim 3 wherein the second hinge means includes a pivot pin mounted on the cab and a hinge bracket secured to the door and pivotable about said pivot pin and wherein there is provided a check strap to limit the extent to which the door may be opened, said check strap also serving as the ratchet member and having teeth formed thereon.

6. A motor vehicle as claimed in claim 3 wherein said second hinge means includes a pivot pin mounted on the cab and a hinge bracket secured to the door, the hinge bracket also serving as the ratchet member and having teeth formed therein.

* * * * *